(12) United States Patent
Yang

(10) Patent No.: US 11,717,787 B2
(45) Date of Patent: Aug. 8, 2023

(54) HIGH FREE VOLUME MEMBRANE FOR GAS SEPARATION

(71) Applicant: Saudi Arabian Oil Company, Dhahran (SA)

(72) Inventor: Junyan Yang, Acton, MA (US)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 17/140,395

(22) Filed: Jan. 4, 2021

(65) Prior Publication Data

US 2022/0212139 A1 Jul. 7, 2022

(51) Int. Cl.
*B01D 53/22* (2006.01)
*B01D 67/00* (2006.01)
*B01D 69/02* (2006.01)
*B01D 71/16* (2006.01)
*B01D 71/18* (2006.01)
*B01D 71/62* (2006.01)
*C10L 3/10* (2006.01)

(52) U.S. Cl.
CPC ....... *B01D 53/228* (2013.01); *B01D 67/0083* (2013.01); *B01D 67/0093* (2013.01); *B01D 69/02* (2013.01); *B01D 71/16* (2013.01); *B01D 71/18* (2013.01); *B01D 71/62* (2013.01); *C10L 3/104* (2013.01); *B01D 2325/023* (2013.01); *C10L 2290/548* (2013.01)

(58) Field of Classification Search
CPC .. B01D 69/02; B01D 67/0093; B01D 53/228; B01D 2325/023; B01D 67/0083; B01D 71/62; B01D 71/18; B01D 71/16; C10L 3/104; C10L 2290/548
See application file for complete search history.

(56) References Cited

U.S. PATENT DOCUMENTS

| 7,410,525 | B1 | 8/2008 | Liu et al. | |
|---|---|---|---|---|
| 7,998,246 | B2 | 8/2011 | Liu et al. | |
| 9,452,392 | B2 | 9/2016 | Sano et al. | |
| 10,363,546 | B2 | 7/2019 | Song et al. | |
| 2009/0152755 | A1* | 6/2009 | Liu | B01D 69/08 264/115 |
| 2009/0155464 | A1* | 6/2009 | Liu | B01D 69/148 427/243 |
| 2010/0144049 | A1* | 6/2010 | Combes | G01N 1/405 422/267 |

(Continued)

FOREIGN PATENT DOCUMENTS

| CN | 108126534 | 12/2020 |
|---|---|---|
| WO | 2015129925 | 9/2015 |

OTHER PUBLICATIONS

Le et al., "Pebax/POSS mixed matrix membranes for ethanol recovery from aqueous solutions via pervaporation," Journal of Membrane Science 379.1-2, Sep. 2011, 174-183, 10 pages.

(Continued)

*Primary Examiner* — Anthony R Shumate
(74) *Attorney, Agent, or Firm* — Fish & Richardson P.C.

(57) ABSTRACT

A gas separation membrane, methods of forming the membrane, and methods of using the membrane for gas separation are provided. An exemplary gas separation membrane includes a cellulosic matrix and a polymer of intrinsic microporosity (PIM). The PIM includes chains coupled by a heat-treating under vacuum.

12 Claims, 9 Drawing Sheets

(56) References Cited

U.S. PATENT DOCUMENTS

| | | | |
|---|---|---|---|
| 2011/0120940 A1 | 5/2011 | Allen et al. | |
| 2011/0294806 A1* | 12/2011 | Qi | A61P 21/00 544/333 |
| 2012/0041084 A1* | 2/2012 | Du | C08G 65/48 264/165 |
| 2013/0098242 A1* | 4/2013 | Ungerank | B01D 53/226 96/10 |
| 2014/0345457 A1* | 11/2014 | Balster | B01D 69/08 96/9 |
| 2016/0045556 A1* | 2/2016 | Saha | A61K 31/65 424/93.41 |
| 2016/0051597 A1* | 2/2016 | Saha | A61P 15/08 600/1 |
| 2016/0367948 A1* | 12/2016 | Song | B01D 69/148 |
| 2017/0210101 A1* | 7/2017 | Peinemann | B32B 27/065 |
| 2017/0368497 A1* | 12/2017 | Priske | B01D 53/225 |
| 2018/0133644 A1* | 5/2018 | Liu | B01D 53/226 |
| 2019/0022599 A1* | 1/2019 | Takeuchi | D06N 3/0015 |
| 2019/0321787 A1 | 10/2019 | Sivaniah et al. | |
| 2019/0388466 A1* | 12/2019 | Jankauskaite | A61K 47/34 |
| 2020/0316516 A1* | 10/2020 | Wu | C10L 3/101 |

OTHER PUBLICATIONS

Madhavan et al., "Poly (dimethylsiloxane-urethane) membranes: effect of linear siloxane chain and caged silsesquioxane on gas transport properties." Journal of Polymer Research 18.6, Nov. 2011, 1851-1861, 11 pages.
Rahman et al., "Influence of temperature upon properties of tailor-made PEBAX® MH 1657 nanocomposite membranes for post-combustion CO2 capture." Journal of Membrane Science 469, Nov. 2014, 344-354, 11 pages.
PCT International Search Report and Written Opinion in International Appln. No. PCT/US2022/011124, dated Apr. 12, 2022, 18 pages.
Akbarzadeh et al., "High performance compatible thiazole-based polymeric blend cellulose acetate membrane as selective CO2 absorbent and molecular sieve." Carbohydrate Polymers 252, Jan. 2021, 11 pages.
Yong et al., "Recent advances in polymer blend membranes for gas separation and pervaporation." Progress in Materials Science 116, Feb. 2021, 33 pages.
PCT International Search Report and Written Opinion in International Appln. No. PCT/US2022/011062, dated Apr. 29, 2022, 13 pages.
Gamali et al., "Distinguished discriminatory separation of CO2 from its methane-containing gas mixture via PEBAX mixed matrix membrane," Chinese Journal of Chemical Engineering, 2018, 26:73-80, 8 pages.
U.S. Appl. No. 17/140,393, Yang, Jan. 4, 2021.
Amici et al., "UV Processing and Characterization of polyhedral oligomeric silsesquioxane (POSS) nanocomposites", European Society for Composite Materials 2004, 10 pages.
Chua et al., "Polyetheramine-polyhedral oligomeric silsesquioxane organic-inorganic hybrid membranes for CO2/H2 and CO2/N2 separation", Journal of Membrane Science, 385-386, 2011, 40-48, 9 pages.
Du et al., "Polymers of intrinsic microporosity containing trifluoromethyl and phenylsulfone groups as materials for membrane gas separation." Macromolecules 41.24, 2008, 9656-9662, 7 pages.
Guerrero et al., "Investigation of amino and amidino functionalized Polyhedral Oligomeric Silsesquioxane (POSS®) nanoparticles in PVA-based hybrid membranes for CO2/N2 separation", Journal of Membrane Science, 544, 2017, 161-173, 13 pages.
Hao et al., "PIM-1 as an organic filler to enhance the gas separation performance of Ultem polyetherimide," Journal of Membrane Science, 453: Mar. 2014, 614-623, 10 pages.
Hou et al., "PIM-1 as an organic filler to enhance CO2 separation performance of poly (arylene fluorene ether ketone)," Separation and Purification Technology, 242:116766, Jul. 2020, 9 pages.

Iyer et al., "Gas transport properties of polyimide-POSS nanocomposites", Journal of Membrane Science, 358, 2010, 26-32, 7 pages.
Kinoshita et al., "Enhanced PIM-1 membrane gas separation selectivity through efficient dispersion of functionalized POSS fillers", Journal of Membrane Science, 539, 2017, 178-186, 9 pages.
Konnertz et al., "Molecular mobility and gas transport properties of nanocomposites based on PIM-1 and polyhedral oligomeric phenethyl-silsesquioxane (POSS)", Journal of Membrane Science, 529, 2017, 274 285, 43 pages.
Li et al., "Effects of amino functionalized polyhedraloligomeric silsesquioxanes on cross-linked poly (ethylene oxide) membranes for highly-efficient CO2separation", Chemical Engineering Research & Design., 122, 2017, 280-288, 9 pages.
Li et al., "High-Performance Thermally Self-Cross-Linked Polymer of Intrinsic Microporosity (PIM-1) Membranes for Energy Development", *Macromolecules*, 45, 2012, 1427-1437, 11 pages.
Li et al., "Molecular-level mixed matrix membranes comprising Pebax and POSS for hydrogen purification via preferential CO2 removal", International J. Hydrogen Energy, 35, 2010, 10560-10568, 9 pages.
Mohamed et al., "Functional Polyimide/Polyhedral Oligomeric Silsesquioxane Nanocomposites", Polymer, 11, 26, 2019, 17 pages.
Przadka et al., "Multimethacryloxy-POSS as a crosslinker for hydrogel materials", European Polymer Journal, 72, 2015, 34-49, 16 pages.
Rahman et al., "Functionalization of POSS nanoparticles and fabrication of block copolymer nanocomposite membranes for CO2 separation", Reactive & Functional Polymer, 86, 2015, 125-133, 33 pages.
Rahman et al., "PEBAX® with PEG functionalized POSS as nanocomposite membranes for CO2 separation", Journal of Membrane Science, 437, 2013, 286-297, 66 pages.
Rahman et al., "PEG functionalized POSS incorporated Pebax nanocomposite membranes", Procedia Engineering, 44, 2012, 1523-1526, 4 pages.
Rao et al., "Preparation and oxygen/nitrogen permeability of PDMS crosslinked membrane and PDMS/tetraethoxysilicone hybrid membrane", J. Membr. Sci. 303, 2007, 132-139, 8 pages.
Rezakazemi et al., "Synthesis and gas transport properties of crosslinked poly(dimethylsiloxane) nanocomposite membranes using octatrimethylsiloxy POSS nanoparticles", Journal of Natural Gas Science & Engineering, 30, 2016, 10-18, 37 pages.
Robeson, "The Upper Bound Revisited," Journal of Membrane Science, Jul. 2008, 320:390-400, 11 pages.
Salehian et al., "Development of high performance carboxylated PIM-1/P84 blend membranes for pervaporation dehydration of isopropanol and $CO_2/CH_4$ separation," Journal of Membrane Science, 518: Nov. 2016, 110-119, 10 pages.
Sánchez-Laínez et al., "Polymer engineering by blending PIM-1 and 6FDA-DAM for ZIF-8 containing mixed matrix membranes applied to CO2 separations," Separation and Purification Technology, 224: Oct. 2019, 456-462, 7 pages.
Song et al., "Controlled thermal oxidative crosslinking of polymers of intrinsic microporosity towards tunable molecular sieve membranes", *Nature Communication* 5.1, 2014, 12 pages.
Wei et al., "POSS-based hybrid porous materials with exceptional hydrogen uptake at low pressure", Microporous & Mesoporous Materials, 193, 2014, 35-39, 5 pages.
Yong et al., "Molecular engineering of PIM-1/Matrimid blend membranes for gas separation," Journal of Membrane Science, Jul. 2012, 407-408, 45-57, 11 pages.
Yong et al., "Molecular interaction, gas transport properties and plasticization behavior of cPIM-1/Torlon blend membranes," Journal of Membrane Science, 462: Jul. 2014, 119-130, 12 pages.
Zhang et al., "Polymer/polyhedral oligomeric silsesquioxane (POSS) nanocomposites: An overview of fire retardance", Progress in Polymer Science, 67, 2017, 77-125, 49 pages.

(56) References Cited

OTHER PUBLICATIONS

Zhao et al., "Blending of compatible polymer of intrinsic microporosity (PIM-1) with Tröger's Base polymer for gas separation membranes," Journal of Membrane Science, 566: Nov. 2018, 77-86, 34 pages.

* cited by examiner

HIGH FREE VOLUME MEMBRANE FOR GAS SEPARATION

TECHNICAL FIELD

The present disclosure is directed to polymeric membranes for gas separation. More specifically, the membranes are formed from blends of glassy polymers with high free volume polymers.

BACKGROUND

Natural gas supplies 22% of the energy used worldwide, and makes up nearly a quarter of electricity generation. Further, natural gas is an important feedstock for the petrochemicals industry. According to the International Energy Agency (IEA), the worldwide consumption of natural gas is projected to increase from 120 trillion cubic feet (Tcf) in the year 2012 to 203 Tcf by the year 2040.

Raw, or unprocessed, natural gas is formed primarily of methane ($CH_4$), however it may include significant amounts of other components, including acid gases (carbon dioxide ($CO_2$) and hydrogen sulfide ($H_2S$)), nitrogen, helium, water, mercaptans, and heavy hydrocarbons ($C_{3+}$), among other components. These contaminants must be removed during gas processing in order to meet the standard pipeline specifications of sales gas. In particular, the removal of acid gases ($CO_2$ and $H_2S$) has been a significant research topic due to the problematic effects of acid gases on natural gas heating value, pipeline transportability, and pipeline corrosion in the presence of water.

Currently, the majority of gas processing plants remove $CO_2$ and $H_2S$ from natural gas by absorption technology, such as amine adsorption. However, several drawbacks are associated with this technology, including energy usage, capital cost, maintenance requirements, and the like.

SUMMARY

An embodiment described in examples herein provides a gas separation membrane. The gas separation membrane includes a cellulosic matrix and a polymer of intrinsic microporosity (PIM). The PIM includes chains coupled by a heat-treating under vacuum.

Another embodiment described in examples herein provides a method for forming a gas separation membrane. The method includes forming a cellulosic polymer solution, forming a polymer of intrinsic microporosity (PIM) solution, and blending the polymer solution of the cellulosic polymer with the polymer solution of the PIM to form a mixed polymer solution. A dense film is formed from the mixed polymer solution. The dense film is dried. The dense film is heat-treated under heat and vacuum to couple the PIM chains.

Another embodiment described in examples herein provides a method for removing at least a portion of an acid gas from a natural gas feedstock to form a sweetened natural gas. The method includes flowing the natural gas feedstock over a membrane, wherein the membrane includes a cellulosic matrix and a polymer of intrinsic microporosity (PIM), wherein the PIM includes chains coupled by a heat-treating under vacuum. The portion of the acid gas is isolated in a permeate from the membrane. The sweetened natural gas is produced in a retentate from the membrane.

DETAILED DESCRIPTION

Figure 1A:
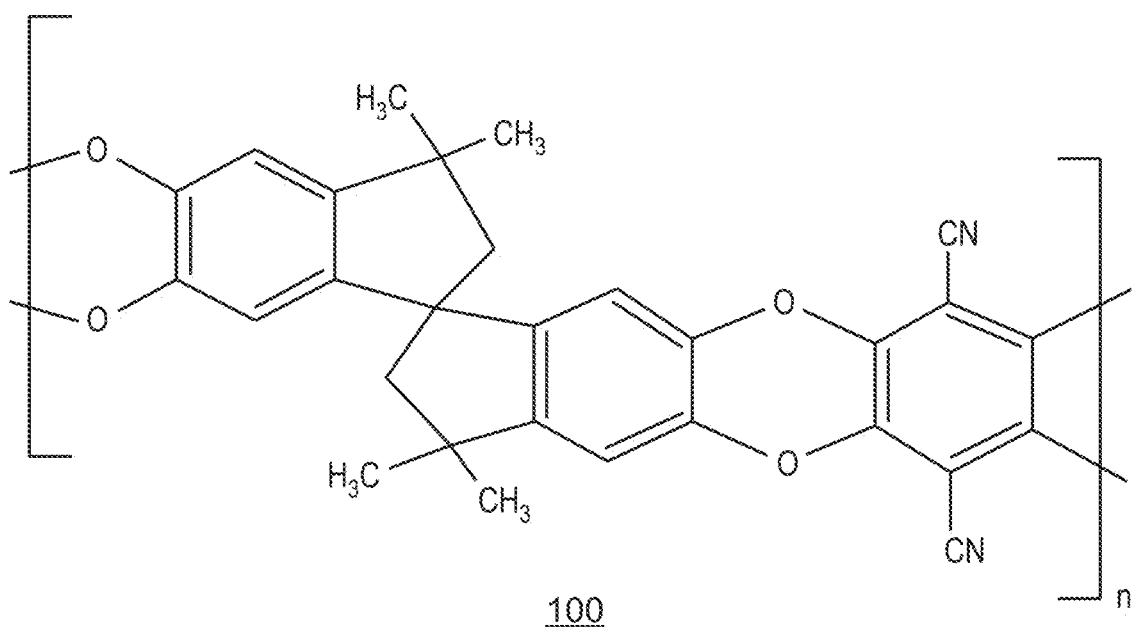
FIG. 1A is a drawing of the molecular structure of an example of a polymer of intrinsic microporosity, e.g., polymer of intrinsic microporosity-1 (PIM-1).

Polymeric membranes are thin semipermeable barriers that selectively separate some gas compounds from others. These membranes do not operate as a filter, where small molecules are separated from larger ones through a medium with pores, rather they separate based on the rate of dissolution and diffusion of compounds through the material of the membrane, termed the solution-diffusion model.

The use of polymeric membrane-based technology for gas separation has gained industrial attention recently due to the potential for high energy efficiency, small footprint, e.g., ease of adaptation into different form factors, and low capital cost. There are many factors affecting the gas separation performance of a polymeric membrane. High permeation flux and gas-pair selectivity are regarded as two of the most important criteria for the selection of a membrane for industrial use. However, there exists a trade-off between permeability and selectivity, as described herein.

Numerous polymeric membranes for gas separation have been developed over the decades, but few are currently commercialized for use in sour gas separation applications. Examples of polymeric materials used to form gas separation membranes include cellulose acetate (CA), polyimides (PI), and perfluoropolymers, such as polytetrafluoroethylene (PTFE), perfluorocycloalkene (PFCA), and the like. These polymeric materials are generally amorphous polymers that form glasses, for example, having a $T_g$ of greater than about 100° C. CA is the most commercially used glassy polymer for acid gas removal. For example, UOP LLC's Separex™ CA membrane is used extensively for $CO_2$ removal from natural gas. However, for wider implementation, CA membranes may be improved in a number of properties, including permeability and selectivity and enhanced chemical and thermal stability under the operating conditions that are typical of gas fields, such as higher feed pressure and high acid gas concentration.

To improve separation performance and stability, new membrane materials, including new polymeric materials and modifications of existing polymeric materials have been studied. However, some barriers, such as trade-offs in selectivity versus permeability, may prevent the deployment of these materials in industrial processes. Among various approaches, the use of polymer blends to form membranes has been recognized as one of the most promising routes as it combines the advantages of different materials into a new compound with unique and synergetic properties that are difficult to be obtained by synthetic means.

Embodiments described herein provide a method to produce a membrane from a polymer blend that has high permeability and selectivity. The matrix of the membrane is a cellulosic polymer, such as cellulose acetate (CA). A polymer of intrinsic microporosity (termed PIM herein) is a highly permeable polymer that is blended into the cellulosic matrix. Membranes formed from these blends are thermally treated in a high temperature vacuum oven to increase free volume (or pore) space by coupling PIM chains through a triazine ring formed during the heating. The heat-treated membranes have been tested for sour gas separations, and exhibit significant improvements in the removal of $CO_2$ and $H_2S$ from a raw natural gas under a high-pressure gas feed when compared to neat CA membranes.

FIG. 1A is a drawing of the molecular structure of an example of a polymer of intrinsic microporosity, e.g., polymer of intrinsic microporosity-1 (PIM-1). As described herein, PIMs are microporous materials with interconnected pores separated by less than 2 nm. PIM-1 has demonstrated extremely high $CO_2$ permeability (>4000 Barrer) and relatively low-to-moderate $CO_2/CH_4$ selectivity (about 11) under acid gas feed testing conditions, due to its high free volume and high internal surface area.

Figure 1B:
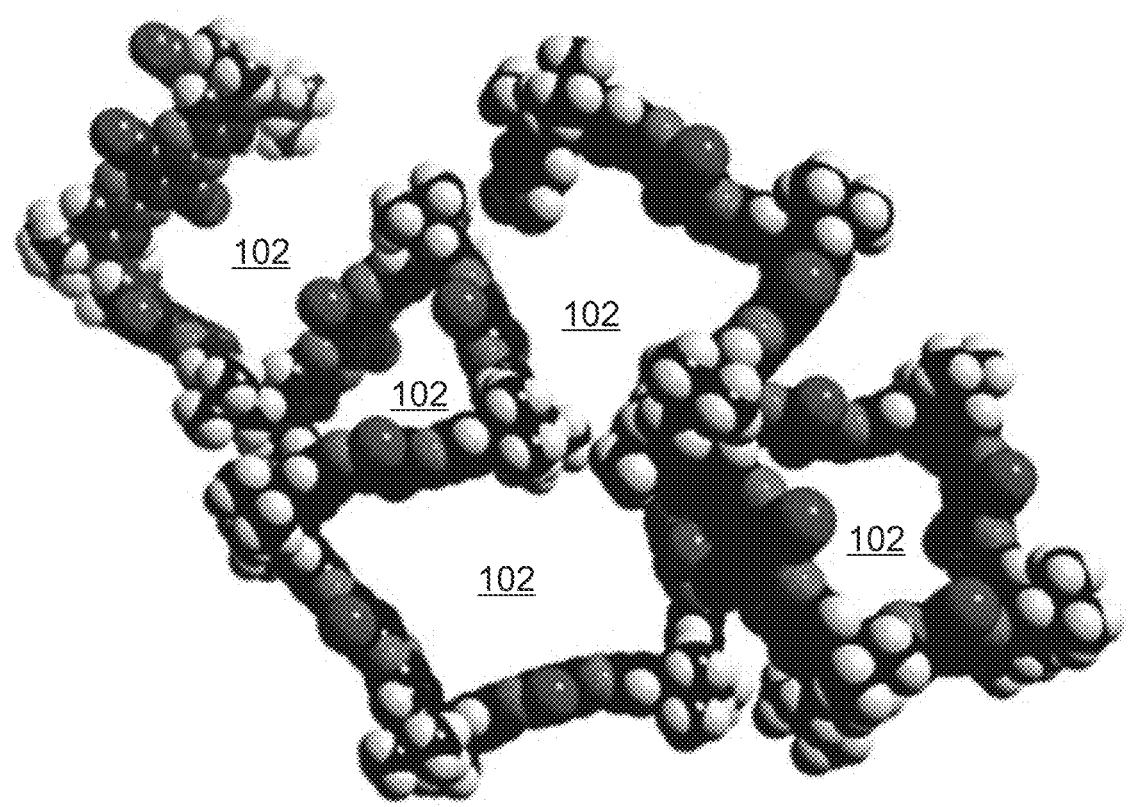
FIG. 1B is a space filling drawing of PIM-1, showing the pores of the structure.

FIG. 1B is a space filling drawing of PIM-1, showing the pores 102 of the structure. PIMs have been compared to various inorganic microporous materials such as activated carbon and zeolites due to their large surface area and highly rigid and contorted molecular structure that provide a large fractional free volume (FFV). This is shown for PIM-1 by the pores 102 illustrated in the space filling drawing.

Figure 2:
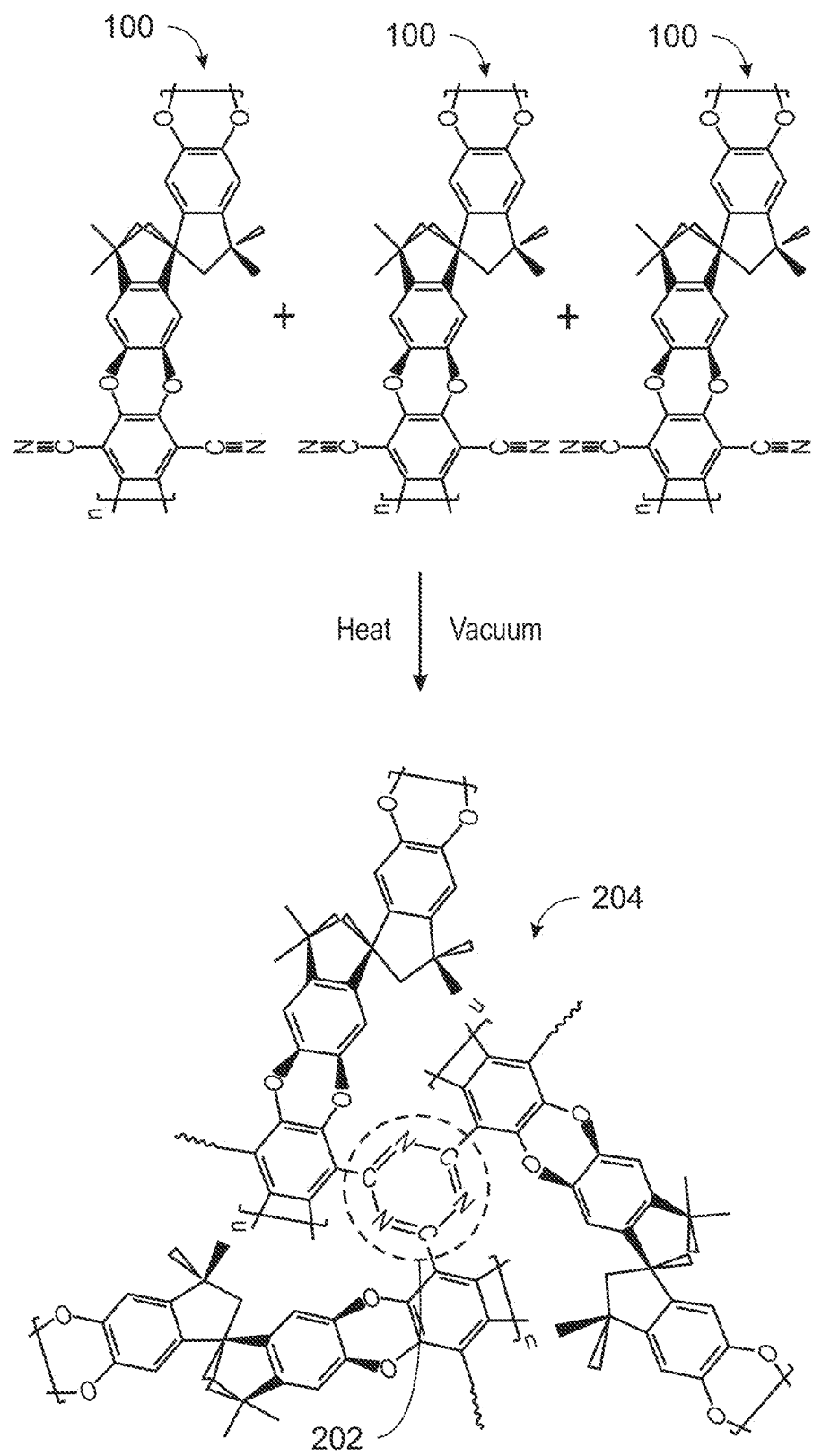
FIG. 2 is a schematic drawing of the coupling of PIM-1 chains under vacuum and high heat conditions.

FIG. 2 is a schematic drawing 200 of the coupling of PIM-1 chains 100 under vacuum and high heat conditions. Placing the PIM-1 under vacuum and high heat conditions can couple the chains through the formation of a triazine ring 202 from functional groups (—CN moieties) attached to the PIM-1, forming coupled PIM-1 structures 204.

Figure 3:
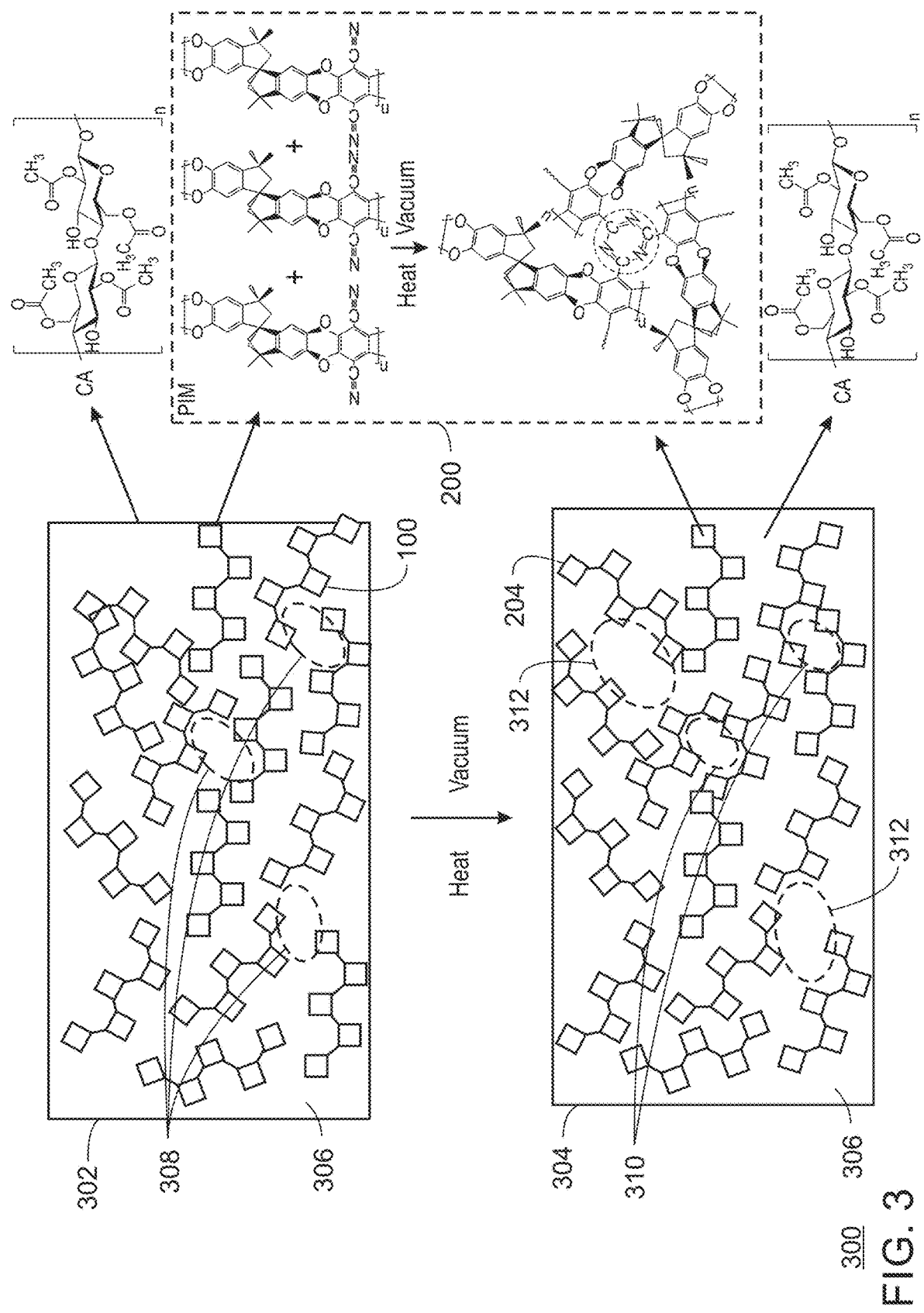
FIG. 3 is a schematic drawing of a process for preparing membranes from blends of cellulose acetate (CA) and PIM-1.

FIG. 3 is a schematic drawing of a process 300 for preparing membranes 302 and 304 from blends of CA and PIM-1. Like numbered items are as described with respect to FIGS. 1 and 2. As described herein, a PIM, such as PIM-1 chains 100, is incorporated into a cellulosic matrix, such as a CA matrix 306, from which a membrane is formed, such as the CA/PIM-1 membrane 302. The CA/PIM-1 membrane 302 has pores 308 formed from the PIM-1 chains 100, for example, as described with respect to the pores 102 of the PIM-1 chains 100 or due to pores formed as the PIM-1 pushes apart the CA matrix 306. It may be noted that the term "pores" is used to refer to regions of free volume within the membranes 302 and 304, and does not refer to accessible openings within or through the membranes 302 and 304. Although PIM-1 is shown in examples herein, the techniques are not limited to the use of PIM-1. In other embodiments, other PIMs that include cyano moieties may be used, such as PIM-2, PIM-3, PIM-4, or PIM-5, among others.

The CA/PIM-1 membrane 302 is thermally treated in a high temperature vacuum oven, for example, at about 100° C. to 250° C., or about 150° C. to about 180° C., or about 165° C., to form a thermally treated membrane comprising the coupled PIM-1 structures 204, termed a T-CA/PIM-1 membrane 304, herein. The coupling of the PIM-1 chains 100 to form the coupled PIM-1 structures 204 modifies the sizes of the pores 308 in the CA/PIM-1 membrane 302. In the T-CA/PIM-1 membrane 304, some pores 310 are decreased in size and other pores 312 are increased in size in comparison to the pores 308 in the CA/PIM-1 membrane 302.

In tests described with respect to the examples, the T-CA/PIM-1 membrane 304 showed improved permeability, such as to $CO_2$ and $H_2S$, and selectivity, for example, between $CO_2/CH_4$ and between $H_2S/CH_4$, compared to a neat CA membrane. This is likely due to chain relaxation from the coupling of the PIM-1 chains 100 creating a favorable morphology for enhancement of permeability and separation.

EXAMPLES

Preparation of Membranes

Figure 4:
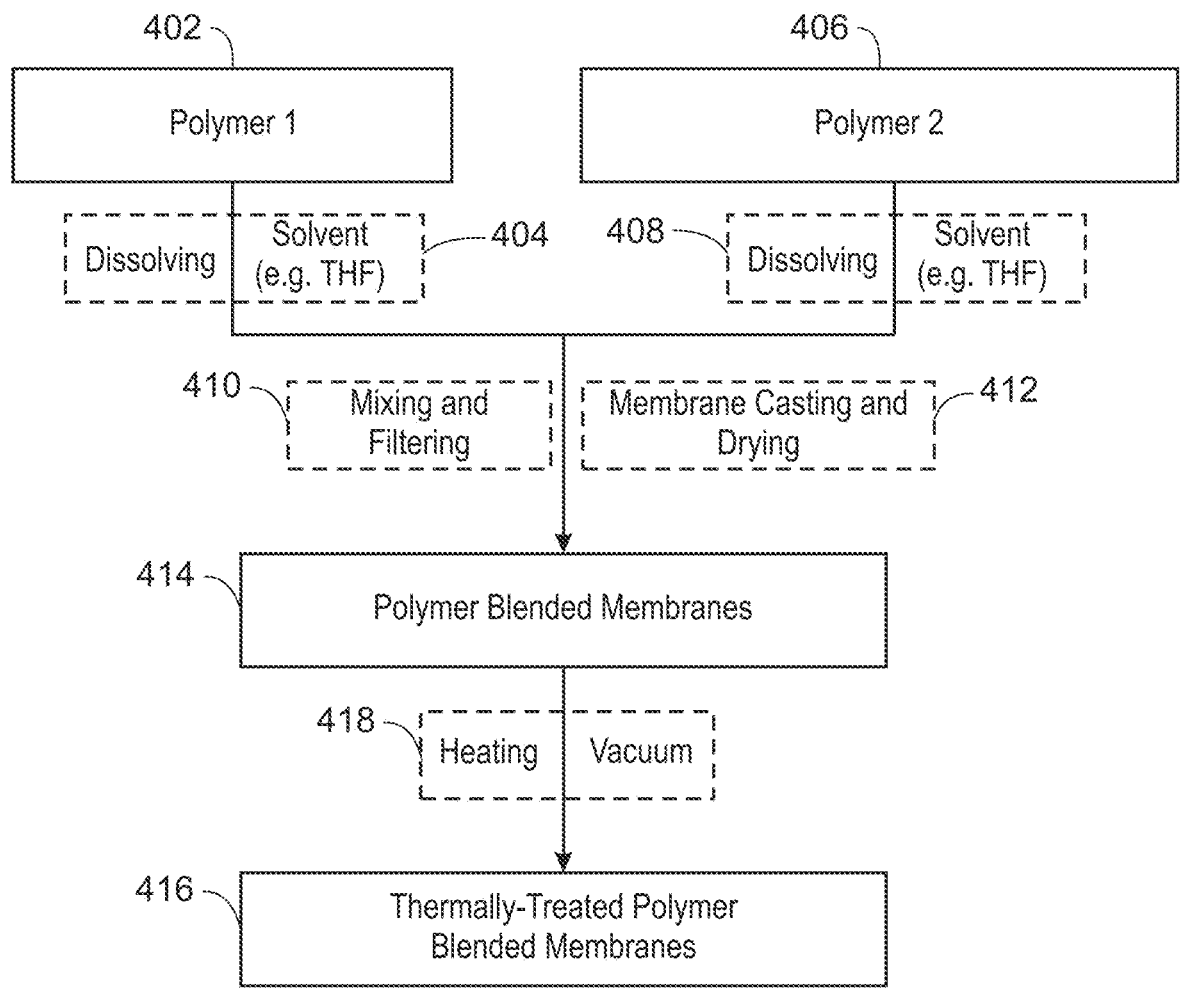
FIG. 4 is a schematic drawing of a method for the fabrication of a T-CA/PIM-1 membrane.

FIG. 4 is a schematic drawing of a method 400 for the fabrication of a T-CA/PIM-1 membrane. The method begins with the preparation of a neat CA solution. This is performed by adding dried CA powder 402 (Mw=50,000) to tetrahydrofuran (THF). The neat CA solution formed is rolled to completely dissolve 404 it at room temperature. The concentration of the neat CA solution is between about 1 wt. % and about 10 wt. %, or between about 4 wt. % and about 8 wt. %.

After the neat CA solution is prepared, a neat PIM-1 solution is prepared. To prepare the neat PIM-1 solution, a dried PIM-1 polymer 406 was added to THF at different loadings, for example, from about 2.5 wt. % to about 95 wt. % of the amount of the CA used to form the neat CA solution. The neat PIM-1 solution is rolled to completely dissolve 408 at room temperature.

The neat CA solution and the neat PIM-1 solution were then mixed 410 to form a CA/PIM-1 solution. The CA/PIM-1 solution was then stirred for 60 minutes to ensure homogeneity. The CA/PIM-1 solution was then left unstirred for 30 minutes to release any air bubbles, and filtered to remove any solids.

After the CA/PIM-1 solution was prepared, a casting procedure 412 was used to prepare the CA/PIM-1 membrane 414. For the casting procedure 412, the CA/PIM-1 solution was poured into PTFE flat-bottomed Petri dishes. The Petri dishes were covered to slow solvent evaporation and allowed to dry overnight at room temperature to prepare a dense film. The dense film was then dried in a vacuum oven at 80° C. for 48 hr to form the CA/PIM-1 membrane 414.

Once the CA/PIM-1 membrane 414 is formed, the T-CA/PIM-1 membrane 416 is fabricated. To fabricate the T-CA/PIM-1 membrane 416, the CA/PIM-1 membrane 414 is heated 418 in a high temperature vacuum oven at a temperature in the range of about 150° C. to about 180° C. under a vacuum pressure of less than about 10 mbar, with a heating rate of about 10° C./min. The vacuum oven was held for a period of 72 hr at the maximum temperature. After the thermal treatment process was completed, the T-CA/PIM-1 membrane 416 was allowed to cool to room temperature in the vacuum oven and stored in a drybox.

As described further with respect to the specific examples below, the T-CA/PIM-1 membrane 416 exhibited an increase over a neat CA membrane in membrane permeability ($CO_2$ and $H_2S$) and selectivity ($CO_2/CH_4$ and $H_2S/CH_4$). The increases were maintained under different feed gases, for example, pure, binary, and sour mixed gas, and testing conditions, for example, feed pressures up to 800 psi.

Under single gas testing, for example, at a feed temperature of 25° C. and a feed pressure of 100 psi, T-CA/PIM-1 membranes with a PIM-1 content of less than or about 40 wt. % show an increase over neat CA membranes in $CO_2/CH_4$ selectivity of about 27% to about 33% and an increase in $CO_2$ permeability of about 81% to about 139%. In one example, a T-CA/PIM-1 membrane had a $CO_2/CH_4$ single gas selectivity and a $CO_2$ permeability of 44.28 and 1.07 Barrer, respectively, compared to a neat CA membrane, which had 33.21 and 4.64 Barrer, respectively.

When tested under a binary gas mixture testing (20% $CO_2$/80% $CH_4$) at 800 psi, T-CA/PIM-1 blended membranes with addition of PIM-1 at less than or about 40 wt. % showed significant improvements over neat CA membranes in $CO_2/CH_4$ mixed selectivity (41%-50%) and $CO_2$ permeability (140%-630%) under industrially-relevant testing conditions, e.g., feed pressure up to 800 psi. In one example, a T-CA/PIM-1 membrane had a $CO_2/CH_4$ mixed gas selectivity and a $CO_2$ permeability of 45.23 and 21.12 Barrer, respectively, compared to a neat CA membrane, which had 30.42 and 2.89 Barrer, respectively.

The addition of the PIM-1 in the CA membrane matrix improved the sour gas separation performance under industrially relevant feed stream and testing conditions, such as using a 3-component sour gas mixture containing 3% $CO_2$, 5% $H_2S$ and 92% $CH_4$ and a feed pressure up to 800 psi. Under these conditions, T-CA/PIM-1 blended membranes show improvements over neat CA membranes in membrane permeability (82%-328% and 95%-353% increase in $CO_2$ and $H_2S$, respectively) and selectivity (3% and 8% increase in $CO_2/CH_4$ and $H_2S/CH_4$ mixed gas selectivity, respectively).

Preparation of PIM-1 Polymer

The PIM-1 was prepared by dissolving equimolar amounts of purified monomers, 2,3,5,6-tetra-fluoroterephthalonetrile (TFTPN, 44.063 mmol) and 5,5',6,6'-tetrahydroxy-3,3,3',3'-tetramethyl-1,1'-spirobisindane (TTSBI, 44.063 mmol), in anhydrous DMAc/Toluene (90 mL/45 mL). A polycondensation reaction to form the PIM-1 was catalyzed by $K_2CO_3$ under nitrogen atmosphere at 165° C. for 40 min. The polymer was precipitated into stirring methanol (1600 mL) overnight and washed with methanol several times. Finally, yellow powder was obtained after drying at 80° C. in vacuum oven overnight.

Preparation of Membranes

Example Membranes

Preparation of T-CA/PIM Membranes

CA/PIM-1 membranes were prepared by the techniques described with respect to FIG. 4. In a typical membrane preparation procedure, a sample of 0.8 g dried CA powder (MW=50,000) was dissolved in 10 mL THF (anhydrous, ≥99.9%, Sigma-Aldrich) in a sealed 25 mL glass vial and the CA solution was rolled to dissolve completely at room temperature.

Different amounts of PIM-1, for example, at a number of ratios between 1 wt. % and 95 wt. % of the amount of CA used to form the CA solution, were each dissolved in 10 mL THF. The PIM-1 solutions formed were rolled to dissolve completely at room temperature.

Each of the PIM-1 solutions was mixed with a CA solution, and stirred overnight. The resulting CA/PIM-1 solutions included PIM-1 concentrations of 2.5 wt. %, 5 wt. %, 10 wt. %, 20 wt. %, 30 wt. %, 40 wt. %, 60 wt. %, 80 wt. %, 90 wt. %, and 95 wt. % of the amount of the CA.

Each of the CA/PIM-1 solutions were filtered through a 1 μm pore size PTFE filter to remove impurities, and were then left unstirred for 30 min to release air bubbles. The CA/PIM-1 solutions were then poured into PTFE flat-bottomed Petri dishes to prepare dense films. The Petri dishes were covered to slow solvent evaporation and the CA/PIM-1 solutions were allowed to dry at room temperature overnight to form the dense films. The Petri dishes with the dense films were then dried in a vacuum oven at 80° C. for 48 hr. The resulting CA/PIM-1 membranes were allowed to cool to room temperature in the vacuum oven and stored in a drybox for further studies. The CA/PIM-1 membranes obtained had thicknesses in the range of 10 to 90 μm, as determined by scanning electron microscopy (SEM) images of membrane cross sections, taken on a JEOL 7100F SEM.

Each of the CA/PIM-1 membranes were given a further thermal treatment in a vacuum oven to prepare the T-CA/PIM-1 membranes. After a vacuum of less than about 10 mbar was achieved, the vacuum oven temperature was raised to between 150° C. and 250° C. at a rate of 10° C./min and held for a period of 72 hr. After the thermal treatment process, the membranes were allowed to cool to room temperature in the vacuum oven and stored in a drybox for further studies. The T-CA/PIM-1 membranes obtained had thicknesses in the range of 10 to 90 μm, as determined by SEM.

Comparison Membranes

Preparation of Cellulose Acetate Membranes (Neat CA Membranes)

The neat cellulose acetate (CA) membrane was prepared using a solution casting technique, similar to that described with respect to FIG. 4. A sample of 0.8 g of dried cellulose acetate powder (MW=50,000) was added into 20 mL of THF. The neat CA solution was rolled to dissolve completely at room temperature. The neat CA solution was then filtered through a 1 μm pore size PTFE filter to remove impurities, and poured into a PTFE flat-bottomed Petri dish to prepare a dense film. The CA polymer solution was covered to slow solvent evaporation, and dried at room temperature for 48 hr. After 48 hours at room temperature, the Petri dish was placed in a vacuum oven and dried at 80° C. for 48 hr and then at 110° C. for another 48 hr. The membrane was cooled naturally in the vacuum oven to room temperature and stored in a drybox for further studies. For comparison, multiple neat CA membranes were prepared using this procedure. The neat CA membranes obtained had an average thickness of 10 to 90 μm, as determined by SEM, and were easily peeled off the Petri dishes for permeation testing.

Preparation of Polymer of Intrinsic Microporosity Membranes (Neat PIM-1 Membrane)

The neat polymer of intrinsic microporosity (PIM-1) membrane was prepared using the solution casting technique, similar to that described with respect to FIG. 4. A sample of 0.4 g of PIM-1 was added into 10 mL THF. The PIM-1 solution was rolled to dissolve completely at room temperature. The PIM-1 solution was then filtered with a 1 µm pore size PTFE filter to remove impurities, and poured into a PTFE flat-bottomed Petri dish to prepare a dense film. The Petri dish was covered to slow solvent evaporation, and dried at room temperature for 48 hr. After 48 hours at room temperature, the Petri dish was placed in a vacuum oven and dried at 80° C. for 48 hr. The membrane was allowed to cool to room temperature in the vacuum oven and stored in a drybox for further studies. For comparison, multiple PIM-1 membranes were prepared using this technique. The PIM-1 membranes had an average thickness of 40 to 110 µm, as determined by SEM, and were easily peeled off the Petri dishes for permeation testing.

Membrane Permeation Testing

Figure 5:
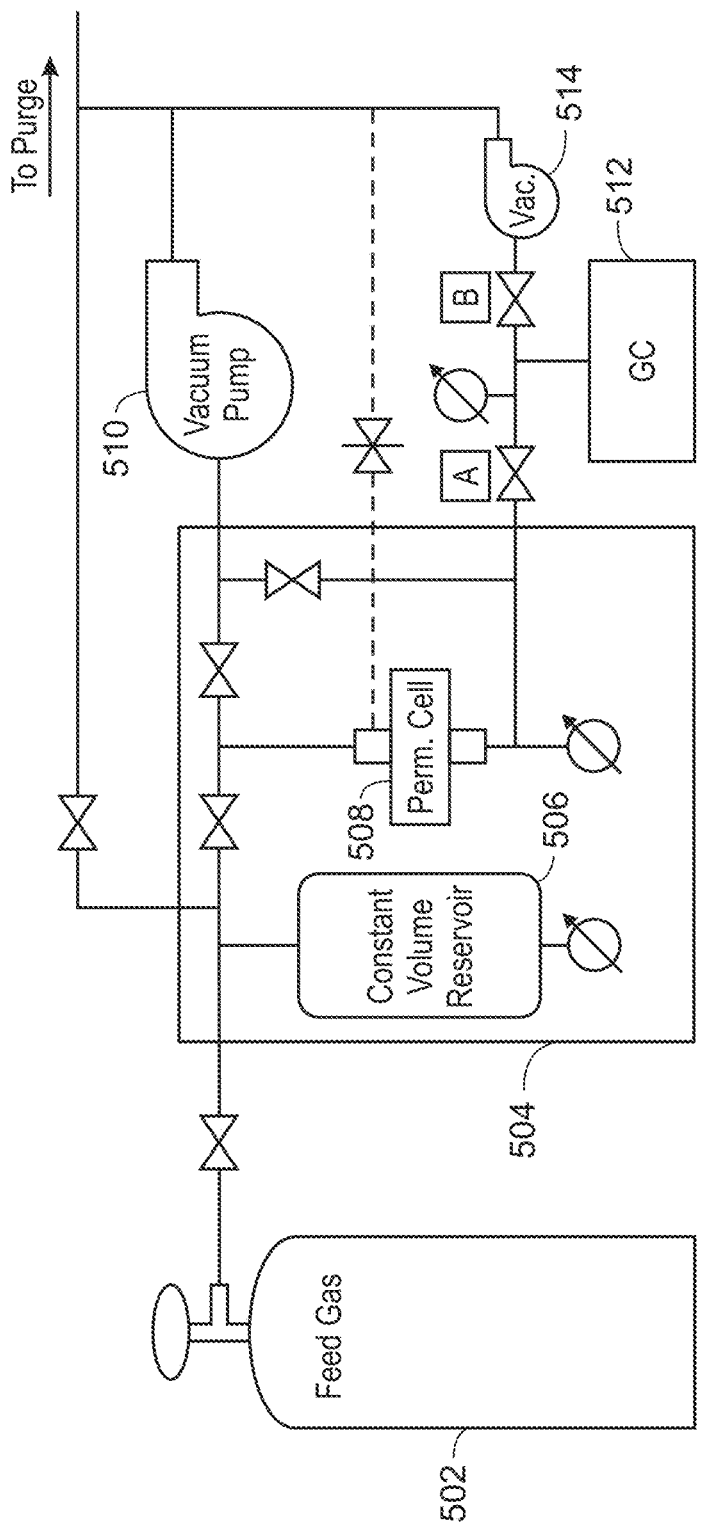
FIG. 5 is a simplified process flow diagram of a permeation apparatus used for measuring single gas and mixed gas permeation properties.

FIG. 5 is a simplified process flow diagram of a permeation apparatus 500 used for measuring single gas and mixed gas permeation properties. The permeation apparatus 500 is a custom-built unit. A feed gas tank 502 holds the gas or gas mixtures used for the tests. Multiple tanks coupled by a gas manifold may be used if sequential gas tests are desirable. A constant temperature enclosure or oven 504 holds the test apparatus, including a constant volume reservoir 506 and the permeation cell 508. The constant volume reservoir 506 ensures that the volume of gases on the membranes under test will remain constant during test parameter changes. The permeation cell 508 is a stainless-steel permeation cell using 47 mm disc filters, purchased from EMD Millipore. A vacuum pump 510 is used to clear the lines of undesirable gases, such as oxygen, nitrogen, and other atmospheric gases, in preparation for the testing. A gas chromatograph 512 is used to detect and quantify the amounts and ratios of gases in the feed to the permeation cell 510 and in the outlet from the permeation cell 508.

Permeation Test Procedures

The gas permeation tests were performed in triplicate using a constant-volume, variable-pressure technique. In this technique, a testing gas (upstream side or feed side) with desired pressure is fed to the permeation cell 508. In the variable-pressure method, the gas permeates through a membrane film into a closed, constant-volume chamber (downstream side, or permeate side) that is evaluated. The downstream pressure rise in the chamber is recorded as a function of time.

For testing, an epoxy masked membrane sample of 5-20 mm in diameter was inserted and sealed in the permeation cell 508. The permeation apparatus 500 was then evacuated for 1 hour before each test, using the vacuum pump 510. Pure gas permeability coefficients were measured at the temperature range of 20° C. to 50° C. and feed pressure range of 25 to 700 psi in the order of $CH_4$ followed by $CO_2$ to avoid swelling.

In addition to single gas tests, binary gas mixtures were used for permeation tests, including a $CO_2/CH_4$ mixture (20/80 vol/vol). Two sour gas feeds were also used for tests. The first is termed a 5% sour gas mixture and included three components, 5 vol. % $H_2S$, 3 vol. % $CO_2$, and 92 vol. % $CH_4$. The second sour gas feed, referred to herein as a 20% sour gas mixture, included five components, 10 vol. % $CO_2$, 20 vol. % $H_2S$, 10 vol. % $N_2$, 3 vol. % $C_2H_6$, and 57 vol. % $CH_4$.

Steady-state permeation was verified using the time-lag method, where 10 times the diffusion time lag was taken as the effective steady state. As used herein, the time-lag method is commonly used to characterize membrane permeation properties. The intercept on the time axis of the plot of pressure rise versus time is defined as the time lag, t. The upstream (feed) pressure and the downstream (permeate) pressure were measured using Baraton absolute capacitance transducers (MKS Instruments) and recorded using LabVIEW software. The permeate pressure was maintained below 100 torr using a second vacuum pump 814. Mixed gas permeation was performed at 20° C. and feed pressure range of 200 psi to 800 psi with binary gas mixture and sour gas mixtures. A retentate stream was added for mixed gas tests and adjusted to 100 times the permeate flow rate to maintain a less than 1% stage cut. As used herein, the stage cut is a ratio of permeate flow to feed flow, and is defined as the fraction of feed gas that permeates the membrane, and is a measure of the degree of separation. The permeate gas was collected and then injected into the gas chromatograph 512, which was a Shimadzu gas chromatograph (GC-2014), to measure permeate composition. Permeate injections were performed at 95 torr. An Isco model 1000D syringe pump (TeledyneIsco) was used to control the feed pressure.

The permeability coefficients of gas i, $P_i$, were calculated according to Equation 1. In equation 1, $dp_i/dt$ is the slope of the steady state pressure rise in the downstream, V is the downstream volume, R is the ideal gas constant, T is the temperature of the downstream, L is the membrane thickness (as determined by SEM), A is the membrane surface area (estimated using ImageJ image processing software), and $\Delta f_i$ is the partial fugacity difference across the membrane calculated using the Peng-Robinson equation. Selectivity, $\alpha_{i/j}$, was calculated as the ratio of permeability coefficients as expressed in Equation 2.

$$P_i = \frac{dP_i}{d_t} \frac{VL}{RTA\Delta f_i} \qquad (1)$$

$$\alpha_{i/j} = \frac{P_i}{P_j} \qquad (2)$$

Membrane Pure Gas Permeation Properties

Figure 6:
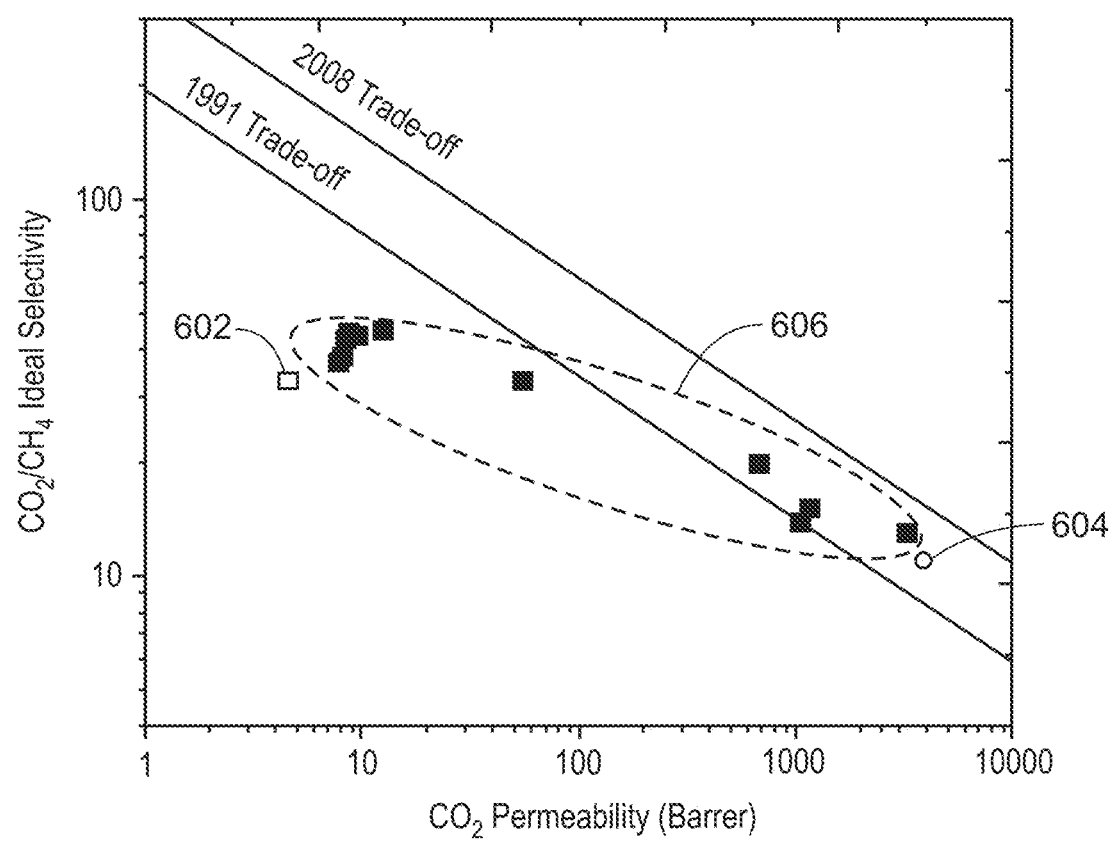
FIG. 6 is a plot of the tradeoff in membrane permeability and selectivity comparing membranes formed from neat CA, neat PIM, and CA/PIM tested under a single gas.

FIG. 6 is a plot of the tradeoff in membrane permeability and selectivity comparing membranes formed from neat CA, neat PIM, and CA/PIM tested under a single gas. Over the last several decades, membrane researchers have developed hundreds of polymeric membranes for gas separation. Studies have determined that there exists a trade-off in behavior between permeability and selectivity, which has been quantitated by studying numerous polymeric membranes. This is indicated in FIG. 6 by the line labeled "1991 trade-off" As polymeric membranes have continued to improve in permeability and selectivity, the line has shifted to a higher level, as indicated by the line labeled "2008 trade-off." These trade-off lines are referred to as the Robeson upper bound lines.

The results shown are for the membrane permeability-selectivity trade-off ($CO_2/CH_4$ vs. $CO_2$) comparison of neat CA membrane 602 (open square), neat PIM-1 membrane 604 (open circle), and T-CA/PIM-1 membranes 606 (solid squares). The PIM-1 loadings for the T-CA/PIM-1 membranes 606 as a weight percent (wt. %) of the CA matrix are (from left to right) 2.5 wt. %, 5 wt. %, 10 wt. %, 20 wt. %, 30 wt. %, 40 wt. %, 80 wt. %, 90 wt. %, and 95 wt. %. The tests were performed in pure gas at 25° C. and 100 psi.

The ideal transport properties are measured by the pure gas permeation and provide preliminary material observations and comparisons. The results show that the $CO_2/CH_4$ gas separation performance is within the Robeson upper bound lines (1991 and 2008). Some of the T-CA/PIM-1 membranes 606, for example, at a loading of PIM-1 or at 80 wt. % or greater, have separation performance that is above the 1991 upper bound. However, these membranes have lower $CO_2/CH_4$ selectivity and are not suitable for actual gas separation.

The incorporation of lower amounts of PIM-1 into the T-CA/PIM-1 membrane 606, for example, 2.5-40 wt. % in the CA matrix, not only leads to a significant increase in gas permeability, but also enhanced selectivity, which makes the membranes suitable for $CO_2/CH_4$ separation. In one example (Table 1), T-CA/PIM-1 membranes at CA/PIM-1 blend ratios of 95/5, 90/10, and 80/20 had $CO_2/CH_4$ selectivities of 42.18, 43.85 and 44.28, respectively, which are a 27% to 32% increase over the neat CA membrane 602, which had a selectivity of 33.21.

Further, the T-CA/PIM-1 blended membranes 606 also exhibited significant enhancement in permeability (81%, 88% and 139% increase in $CO_2$ permeability for T-CA/PIM-1 (95/5), T-CA/PIM-1 (90/10) and T-CA/PIM-1 (80/20), respectively), compared to the neat CA membrane 602. By comparison, the addition of PIM-1 into other glassy polymer membranes, such as Matrimid®, Ultem®, Torlon®, PAFEK®, P84®, TB®, without thermal treatment in vacuum conditions, leads to an increase in $CO_2$ permeability, but a decrease in $CO_2/CH_4$ selectivity.

Figure 7:
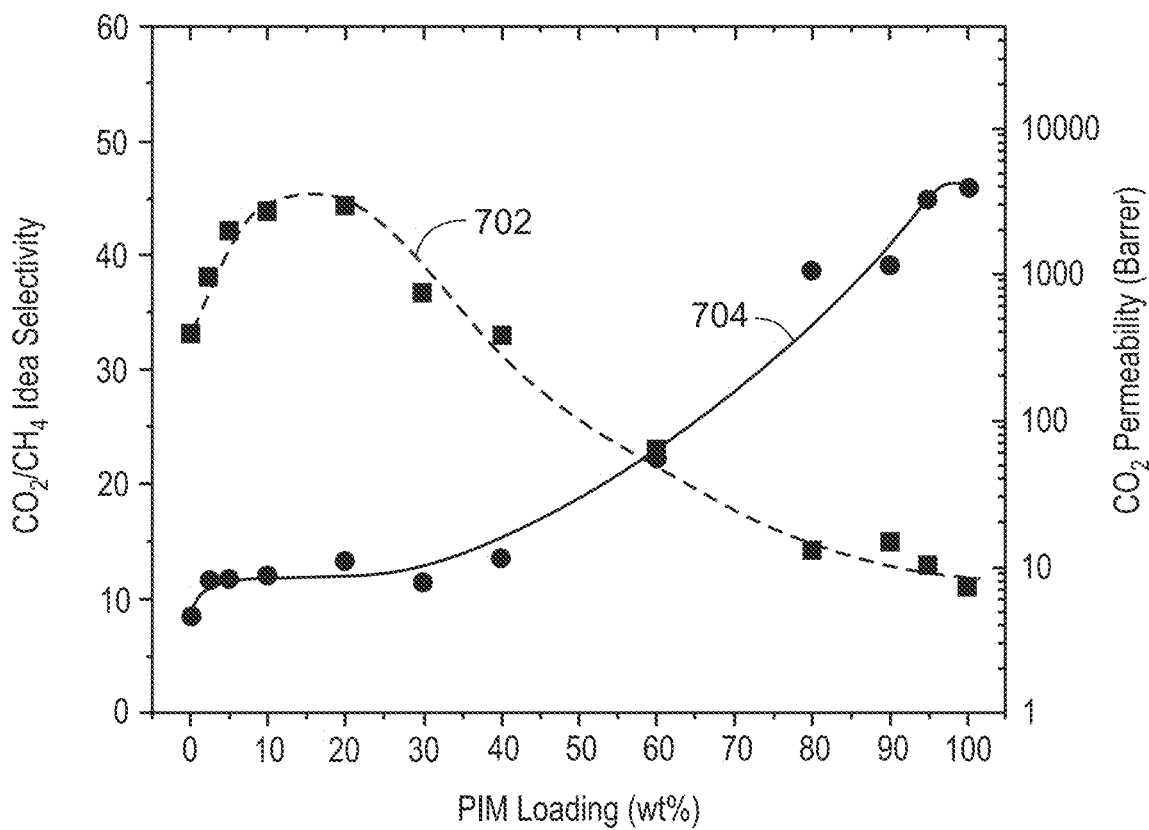
FIG. 7 is a plot comparing the effect of PIM-1 loading on $CO_2/CH_4$ selectivity and $CO_2$ permeability in T-CA/PIM-1 membranes tested under a single gas.

FIG. 7 is a plot comparing the effect of PIM-1 loading on $CO_2/CH_4$ selectivity 702 and $CO_2$ permeability 704 in T-CA/PIM-1 membranes tested under a single gas in comparison to a neat CA membrane. In this test, the PIM-1 loadings as a weight percent of the matrix are 2.5 wt. %, 5 wt. %, 10 wt. %, 20 wt. %, 30 wt. %, 40 wt. %, 80 wt. %, 90 wt. %, and 95%. The tests were performed under a binary gas mixture (20% $CO_2$/80% $CH_4$) at 25° C. and 800 psi.

As shown in FIG. 7, the loading of PIM-1 has a significant influence on the membrane separation performance. Under pure gas testing, the T-CA/PIM-1 membranes show a gradual increase in $CO_2$ permeability 704 with increase of PIM-1 loading below a loading of about 40 wt. %, but a fast increase at higher PIM loading, e.g., greater than about 40 wt. %. On the other hand, the selectivity 702 for $CO_2/CH_4$ increases up to a PIM-1 loading of about 20 wt. %, then decreases at PIM-1 loadings above that level. These results indicate that the membrane separation performance can be adjusted by the PIM-1 loading in a CA matrix.

TABLE 1

Single gas permeation results for neat CA membrane, thermally treated CA/PIM-1 blended membranes (T-CA/PIM-1), and neat PIM-1 membrane for $CO_2/CH_4$ separation

| Membranes | $P_{CO2}$ (Barrer) | $P_{CO2}$ increased | $P_{CH4}$ (Barrer) | $\alpha_{CO2/CH4}$ | $\alpha_{CO2/CH4}$ increased |
|---|---|---|---|---|---|
| Neat CA membrane | 4.64 | — | 0.14 | 33.21 | — |
| T-CA/PIM-1 membrane (95/5) | 8.38 | 81% | 0.20 | 42.18 | 27% |
| T-CA/PIM-1 membrane (90/10) | 8.74 | 88% | 0.20 | 43.85 | 32% |
| T-CA/PIM-1 membrane (80/20) | 11.07 | 139% | 0.25 | 44.28 | 33% |
| T-CA/PIM-1 membrane (60/40) | 11.57 | 149% | 0.25 | 32.96 | −1% |
| Neat PIM-1 membrane | 3906.24 | — | 35.41 | 11.03 | — |

Tested at 25° C. and feed pressure of 100 psi

Membrane Permeation Properties for Binary Gas Mixture

Figure 8:
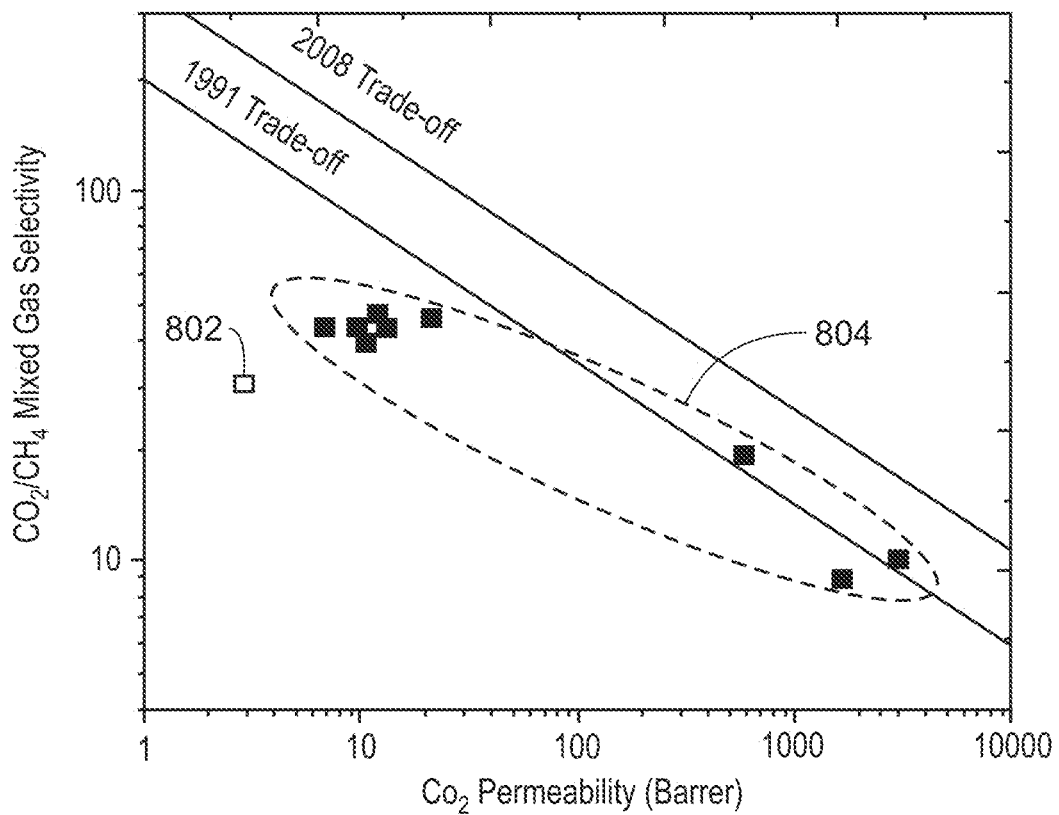
FIG. 8 is a plot of the tradeoff in membrane permeability and selectivity comparing membranes formed from a neat CA membrane and T-CA/PIM-1 membranes at different loadings of PIM-1 tested under a binary gas mixture.

FIG. 8 is a plot of the tradeoff in membrane permeability and selectivity comparing membranes formed from a neat CA membrane 802 and T-CA/PIM-1 membranes 804 at different loadings of PIM-1 tested under a binary gas mixture. The binary gas mixture contained 20% $CO_2$ and 80% $CH_4$ to allow a determination as to whether interactions between one of the gas species and the membrane influences the permeation of the other gas species through the membrane.

FIG. 8 shows the separation performance against the Roberson upper bounds for $CO_2/CH_4$ separation at the feed pressure of 800 psi. Similar to the pure gas test results shown in FIG. 6, the binary gas mixture separation performance is within the upper bound line as the PIM-1 loading increases in the CA matrix.

For $CO_2/CH_4$ separation, the addition of 2.5 wt. %-40 wt. % of PIM-1 increases the $CO_2/CH_4$ mixed gas selectivity and $CO_2$ permeability for T-CA/PIM-1 membranes 804. In one example (Table 3), T-CA/PIM-1 membranes 804 at CA/PIM-1 ratios of 97.5/2.5, 95/5, 90/10, and 80/20 had $CO_2/CH_4$ mixed gas selectivities of 42.80, 42.82, 45.64, and 45.23, respectively, at a feed pressure of 800 psi. These values are a 41%, 41%, 50%, and 49% increase, respectively, over a neat CA membrane 802, which had a $CO_2/CH_4$ mixed gas selectivity of 30.42.

A number of T-CA/PIM-1 membranes also exhibited an increase in permeability over the neat CA membrane 802. For example, for T-CA/PIM-1 at CA/PIM-1 ratios of 97.5/2.5, 95/5, 90/10, and 80/20 increases in $CO_2$ permeability were seen over a neat CA membrane of 140%, 233%, 313% and 631% increase, respectively. Thus, T-CA/PIM-1 membranes demonstrate better overall separation performance under mixed gas testing conditions.

Figure 9:
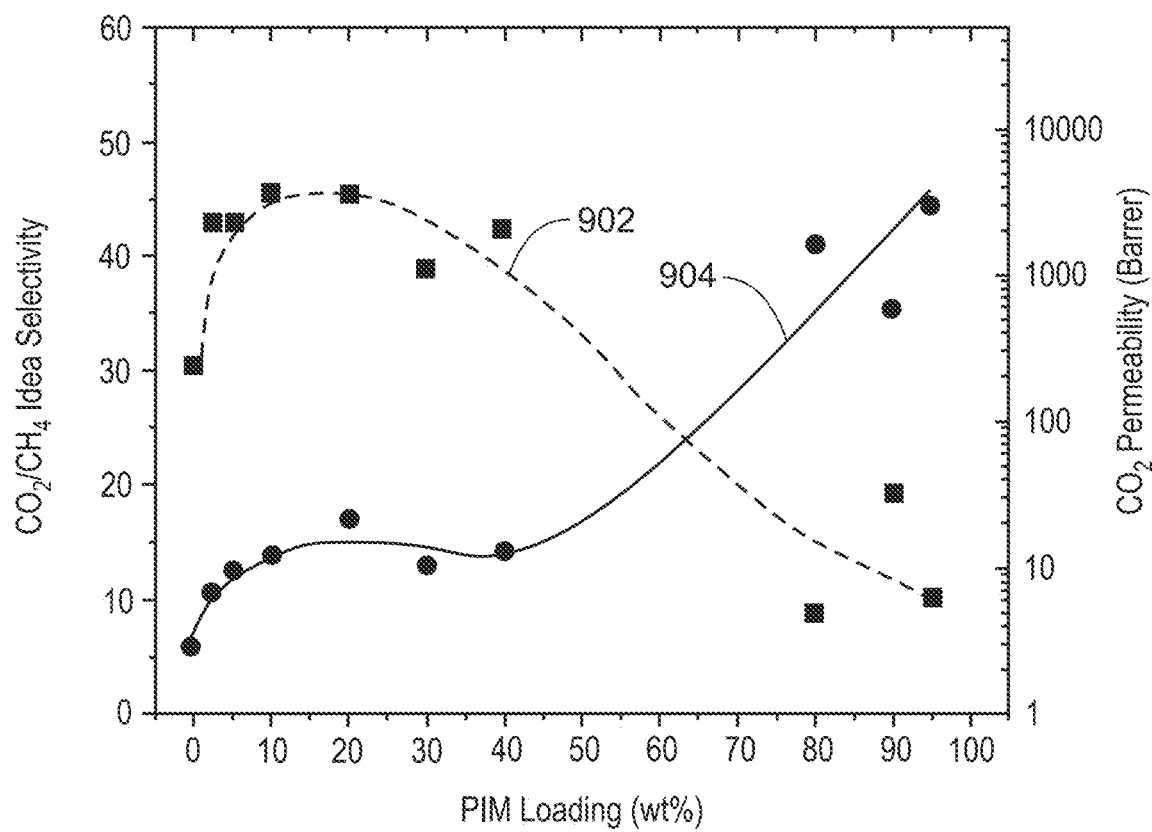
FIG. 9 is a plot of the effect of PIM loading on $CO_2/CH_4$ membrane selectivity and $CO_2$ membrane permeability of T-CA/PIM-1 membranes in comparison to a neat CA membrane under a binary gas mixture.

FIG. 9 is a plot of the effect of PIM loading on $CO_2/CH_4$ membrane selectivity 902 and $CO_2$ membrane permeability 904 of T-CA/PIM-1 membranes under a binary gas mixture. The tests were run with a binary gas mixture of 20% $CO_2$/80% $CH_4$, at 25° C. and 800 psi.

However, the overall mixed gas selectivity for all of the tested membranes are comparable to their ideal selectivity, but at higher $CO_2$ permeability. For example, a T-CA/PIM-1 membrane with a loading of 80/20 CA/PIM-1, has a mixed gas $CO_2$ permeability of 21.12 Barrer, which is 91% higher than its pure gas $CO_2$ permeability of 11.07 Barrer. This increase in permeability may be due to the better sorption interactions of $CO_2$ in a mixed gas and the higher affinity of PIM-1 towards $CO_2$. Similar trends were observed under binary gas mixture tests for T-CA/PIM-1 membranes with a loading of 10%-20%, which have higher $CO_2/CH_4$ mixed gas selectivity in the range of PIM-1 loading of 10%-20%.

TABLE 2

Binary gas mixture (20% $CO_2$/80% $CH_4$) permeation results of neat CA membrane and T-CA/PIM-1 membranes for $CO_2/CH_4$ separation

| Membranes | $P_{CO2}$ (Barrer) | $P_{CO2}$ increased | $P_{CH4}$ (Barrer) | $\alpha_{CO2/CH4}$ | $\alpha_{CO2/CH4}$ increased |
|---|---|---|---|---|---|
| Neat CA membrane | 2.89 | — | 0.095 | 30.42 | — |
| T-CA/PIM-1 membrane (97.5/2.5) | 6.93 | 140% | 0.163 | 42.80 | 41% |
| T-CA/PIM-1 membrane (95/5) | 9.64 | 233% | 0.225 | 42.82 | 41% |
| T-CA/PIM-1 membrane (90/10) | 11.95 | 313% | 0.262 | 45.64 | 50% |
| T-CA/PIM-1 membrane (80/20) | 21.12 | 631% | 0.467 | 45.23 | 49% |
| T-CA/PIM-1 membrane (20/80) | 1674.10 | 57827% | 187.9 | 8.91 | −71% |
| T-CA/PIM-1 membrane (5/95) | 3029.89 | 104741% | 299.97 | 11.03 | −67% |

Tested at 25° C. and feed pressure of 800 psi

Membrane Sour Mixed Gas Permeation Properties

Figure 10A:
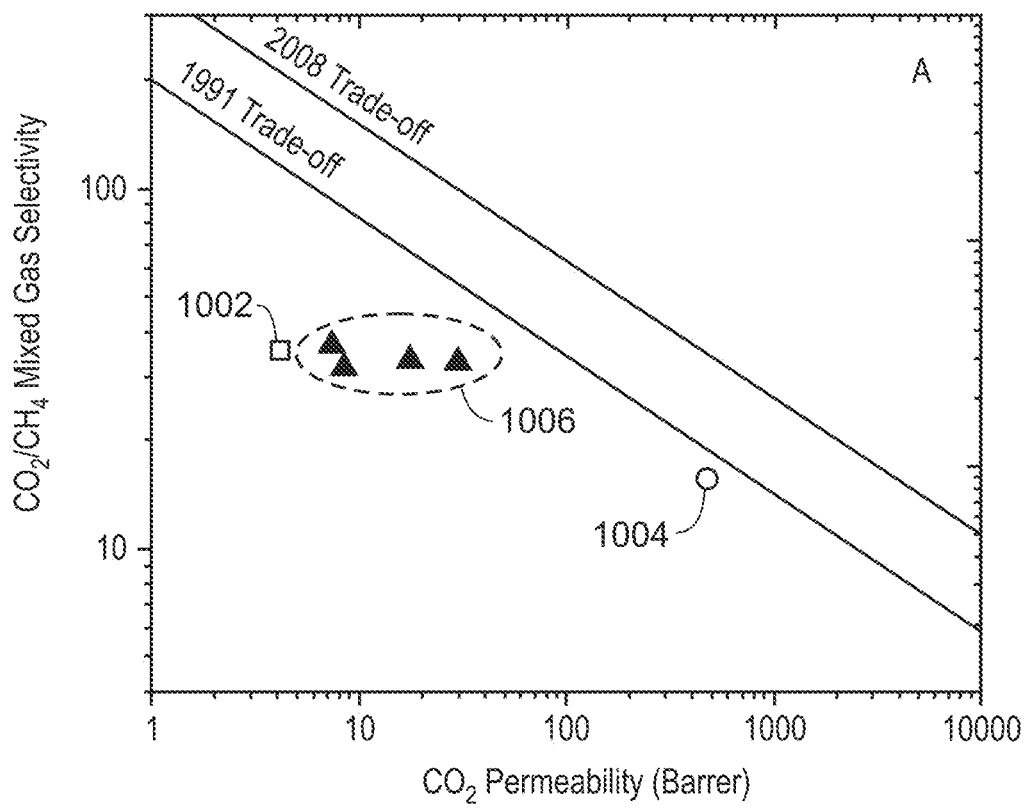
FIGS. 10A and 10B are plots of the tradeoffs of membrane permeability versus membrane selectivity for $CO_2/CH_4$ vs. $CO_2$ and $H_2S/CH_4$ vs. $H_2S$ comparing neat CA thermally treated blends of CA/PIM at different loading levels of PIM under sour mixed gas.
Figure 10B:
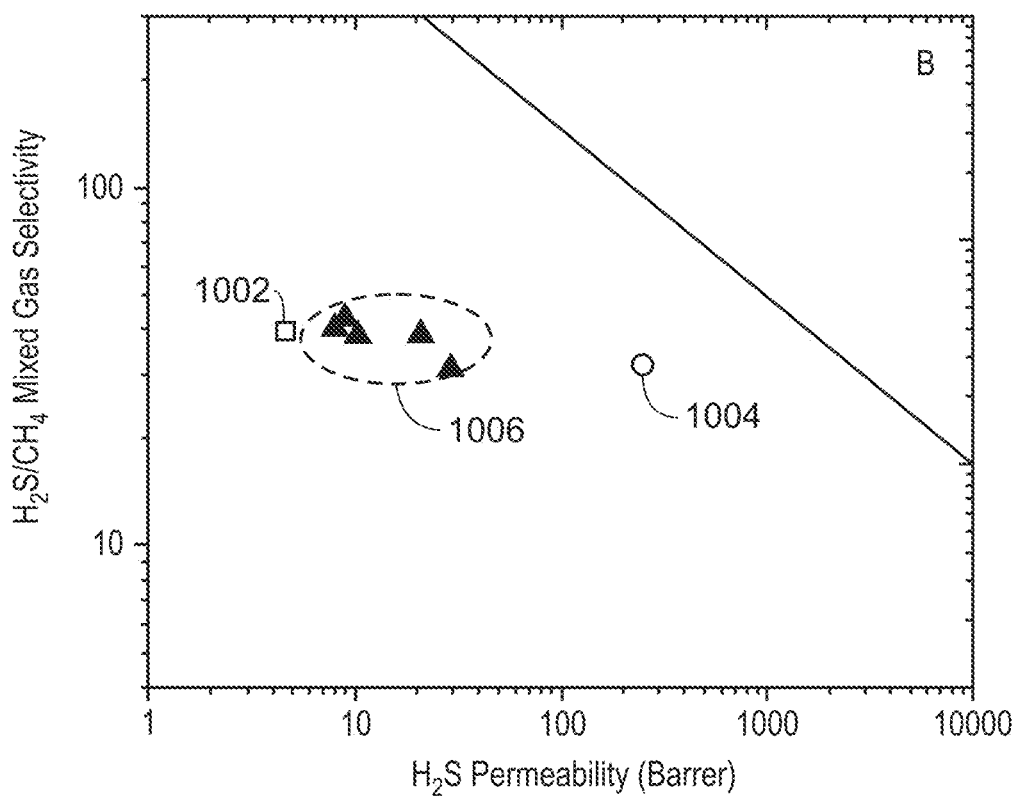

FIGS. 10A and 10B are plots of the tradeoffs of membrane permeability versus membrane selectivity for $CO_2/CH_4$ vs. $CO_2$ and $H_2S/CH_4$ vs. $H_2S$ comparing neat CA thermally treated blends of CA/PIM at different loading levels of PIM. The testing was performed under a sour gas feed (3% $CO_2$/5% $H_2S$/92% $CH_4$) at 25° C. and 800 psi.

FIG. 10A shows the $CO_2/CH_4$ vs. $CO_2$ permeability-selectivity trade-off comparison of neat CA membrane 1002 (open square), neat PIM-1 membrane 1004 (open circle), and T-CA/PIM-1 membranes 1006 (solid blue triangles, from left to right: PIM-1 loadings are 2.5 wt. %, 5 wt. %, 10 wt. %, 20 wt. %, and 80 wt. %). As seen in other tests, the permeation properties of the T-CA/PIM-1 membranes 1006 lie below the upper bound line when PIM-1 loading increases in the CA matrix. FIG. 10B shows the $H_2S/CH_4$ vs. $H_2S$ permeability-selectivity trade-off comparison of the same materials.

However, the T-CA/PIM-1 membranes 1006 show significant improvement over a neat CA membrane in permeability (80%~328% increase in $CO_2$ permeability and 77%~353% increase in $H_2S$ permeabilities), and comparable $CO_2/CH_4$ and $H_2S/CH_4$ mixed gas selectivities with the addition of amounts of PIM-1 of less than about 20 wt. %. In one example (Table 4), a T-CA/PIM-1 membrane with a PIM-1 loading of 5 wt. % had $CO_2/CH_4$ and $H_2S/CH_4$ mixed gas selectivities of 36.66 and 43.11, $CO_2$ and $H_2S$ permeabilities of 7.50 Barrer and 8.90 Barrer, respectively, compared to neat CA membrane $CO_2/CH_4$ and $H_2S/CH_4$ mixed gas selectivities of 35.74 and 39.76, and $CO_2$ and $H_2S$ permeabilities of 4.11 Barrer and 4.57 Barrer, respectively.

An embodiment described in examples herein provides a gas separation membrane. The gas separation membrane includes a cellulosic matrix and a polymer of intrinsic microporosity (PIM). The PIM includes chains coupled by a heat-treating under vacuum.

In an aspect, the cellulosic matrix includes cellulose acetate (CA). In an aspect, the cellulosic matrix includes cellulose acetate butyrate (CAB).

In an aspect, the PIM includes PIM-1. In an aspect, the PIM includes triazine rings coupling PIM chains.

In an aspect, the gas separation membrane includes larger free volume spaces and smaller free volume spaces formed by the heat-treating under vacuum. In an aspect, the gas separation membrane has a $CO_2$ permeability that is at least 50% higher than the $CO_2$ permeability of a neat CA membrane. In an aspect, the gas separation membrane has a $CO_2/CH_4$ mixed gas selectivity that is within +/−10% of a neat CA membrane. In an aspect, the gas separation membrane has an $H_2S$ permeability that is at least 50% higher than the $H_2S$ permeability of a neat CA membrane. In an aspect, the gas separation membrane has an $H_2S/CH_4$ mixed gas selectivity that is within +/−10% of a neat CA membrane.

In an aspect, the gas separation membrane includes between about 2.5 wt. % PIM and about 40 wt. % PIM. In an aspect, the gas separation membrane includes between about 5 wt. % PIM and about 20 wt. % PIM.

Another embodiment described in examples herein provides a method for forming a gas separation membrane. The method includes forming a cellulosic polymer solution, forming a polymer of intrinsic microporosity (PIM) solution, and blending the polymer solution of the cellulosic

TABLE 3

Sour mixed gas permeation properties for neat CA membrane, neat PIM-1 membrane and thermally treated CA/PIM-1 blended membranes (T-CA/PIM)

| Membranes | $P_{CO2}$ (Barrer) | $P_{CO2}$ increased | $P_{H2S}$ (Barrer) | $P_{H2S}$ increased | $\alpha_{CO2/CH4}$ | $\alpha_{CO2/CH4}$ increased | $\alpha_{H2S/CH4}$ | $\alpha_{H2S/CH4}$ increased |
|---|---|---|---|---|---|---|---|---|
| Neat CA | 4.11 | — | 4.57 | — | 35.74 | — | 39.76 | — |
| T-CA/PIM-1(95/5) | 7.50 | 82% | 8.90 | 95% | 36.66 | 3% | 43.11 | 8% |
| T-CA/PIM-1(90/10) | 7.40 | 80% | 8.10 | 77% | 36.79 | 3% | 40.14 | 1% |
| T-CA/PIM-1(80/20) | 17.60 | 328% | 20.70 | 353% | 33.60 | −6% | 38.91 | −2% |
| Neat PIM-1 | 478.90 | — | 250.00 | — | 15.72 | — | 31.82 | — |

Sour mixed gas composition: 3% $CO_2$/5% $H_2S$/92% $CH_4$
Feed temperature: 25° C.; feed pressure: 800 psi polymer with the polymer solution of the PIM to form a mixed polymer solution. A dense film is formed from the mixed polymer solution. The dense film is dried. The dense film is heat-treated under heat and vacuum to couple the PIM chains.

In an aspect, the method includes dissolving a cellulosic polymer in tetrahydrofuran (THF) to form the cellulosic polymer solution. In an aspect, the method includes forming the cellulosic polymer solution by dissolving cellulose acetate in THF.

In an aspect, the method includes dissolving the PIM in THF. In an aspect, the method includes forming the PIM polymer solution by dissolving PIM-1 in THF. In an aspect, the method includes dissolving an amount of PIM that is in a weight ratio to the cellulosic polymer of between about 2.5 wt. % and about 40 wt. %. In an aspect, the method includes dissolving an amount of PIM that is in a weight ratio to the cellulosic polymer of between about 5 wt. % and about 20 wt. %.

In an aspect, the method includes forming triazine rings during the heat treatment under vacuum, wherein the triazine rings couple the PIM chains.

Another embodiment described in examples herein provides a method for removing at least a portion of an acid gas from a natural gas feedstock to form a sweetened natural gas. The method includes flowing the natural gas feedstock over a membrane, wherein the membrane includes a cellulosic matrix and a polymer of intrinsic microporosity (PIM), wherein the PIM includes chains coupled by a heat-treating under vacuum. The portion of the acid gas is isolated in a permeate from the membrane. The sweetened natural gas is produced in a retentate from the membrane.

In an aspect, the cellulosic matrix is formed from cellulose acetate (CA). In an aspect, the PIM is formed from PIM-1. In an aspect, the PIM includes triazine rings formed by the heat-treating under vacuum. In an aspect, larger free volume spaces and smaller free volume spaces are formed by the heat-treating under vacuum.

Other implementations are also within the scope of the following claims.

What is claimed is:

1. A gas separation membrane, comprising:
   a cellulosic matrix; and
   a polymer of intrinsic microporosity (PIM), wherein the PIM comprises chains coupled by a heat-treating under vacuum.

2. The gas separation membrane of claim 1, wherein the cellulosic matrix comprises cellulose acetate (CA).

3. The gas separation membrane of claim 1, wherein the cellulosic matrix comprises cellulose acetate butyrate (CAB).

4. The gas separation membrane of claim 1, wherein the PIM comprises PIM-1.

5. The gas separation membrane of claim 1, wherein the PIM comprises triazine rings coupling PIM chains.

6. The gas separation membrane of claim 1, comprising larger free volume spaces and smaller free volume spaces formed by the heat-treating under vacuum.

7. The gas separation membrane of claim 1, comprising a $CO_2$ permeability that is at least 50% higher than the $CO_2$ permeability of a neat CA membrane.

8. The gas separation membrane of claim 1, comprising a $CO_2/CH_4$ mixed gas selectivity that is within +/−10% of a neat CA membrane.

9. The gas separation membrane of claim 1, comprising an $H_2S$ permeability that is at least 50% higher than the $H_2S$ permeability of a neat CA membrane.

10. The gas separation membrane of claim 1, comprising an $H_2S/CH_4$ mixed gas selectivity that is within +/−10% of a neat CA membrane.

11. The gas separation membrane of claim 1, comprising between about 2.5 wt. % PIM and about 40 wt. % PIM of an amount of a CA in the membrane.

12. The gas separation membrane of claim 1, comprising between about 5 wt. % PIM and about 20 wt. % PIM of an amount of a CA in the membrane.

\* \* \* \* \*